United States Patent [19]

Wakimoto

[11] Patent Number: 4,782,244
[45] Date of Patent: Nov. 1, 1988

[54] ELECTRIC MOTOR EQUIPPED WITH A QUICK-DISCONNECT CABLE CONNECTOR

[75] Inventor: Yasuo Wakimoto, Nagasaki, Japan

[73] Assignee: Mitsubishi Denki Kabushiki Kaisha, Japan

[21] Appl. No.: 133,928

[22] Filed: Dec. 17, 1987

[30] Foreign Application Priority Data

Dec. 23, 1986 [JP] Japan ............................ 61-307229
Jan. 16, 1987 [JP] Japan ................................ 62-6224

[51] Int. Cl.⁴ ............................................. H02K 5/10
[52] U.S. Cl. ...................................... 307/116; 307/149; 310/71; 310/89; 318/786; 361/23
[58] Field of Search ................ 307/116, 149, 150; 310/68 R, 71, 87, 89; 318/778, 785; 29/33 M, 749, 753, 854, 867; 361/1, 91, 117, 23; 439/391, 411, 263, 181, 533, 559, 805, 807, 926; 440/6, 7, 54, 153; 417/422

[56] References Cited

U.S. PATENT DOCUMENTS 4,451,750  5/1984  Heuer et al. ................. 310/71 X
4,517,481  5/1985  Breining ...................... 310/89 X
4,546,300 10/1985  Shaikh ......................... 318/786

Primary Examiner—William M. Shoop, Jr.
Assistant Examiner—Paul Ip
Attorney, Agent, or Firm—Leydig, Voit & Mayer

[57] ABSTRACT

An electric motor is connected to a power supply by a quick-disconnect cable connector which can be detachably connected to a terminal box of the motor. In one form of the invention, a protective cover is detachably mounted on the terminal box over the cable connector so that the cable connector can not be connected or disconnected without first removing the protective cover. A sensor detects the state of mounting of the protective cover and produces a corresponding output signal, on the basis of which a control circuit automatically electrically disconnects the cable connector from the power supply of the motor when the protective cover is removed from the terminal box. In another form of the invention, the motor is a pole change motor which can operate with either a first number of poles or a second number of poles. The terminal box has a first terminal corresponding to the first number of poles and a second terminal corresponding to the second number of poles. A detector detects whether the cable connector is connected to the first or the second terminal and produces a corresponding output signal. A control circuit automatically connects the motor to a protection device for the first number of poles or a protection device for the second number of poles based on the output of the detector.

7 Claims, 8 Drawing Sheets

ELECTRIC MOTOR EQUIPPED WITH A QUICK-DISCONNECT CABLE CONNECTOR

BACKGROUND OF THE INVENTION

This invention relates to an electric motor which is equipped with a cable connector of the type referred to as a "quick-disconnect" cable connector. and more particularly, it relates to an electric motor which is safer to operate than a conventional electric motor of this type.

A "quick-disconnect" cable connector refers to a cable connector for connecting an electric motor to a circuit which can be easily connected to and disconnected from the motor without the use of special tools or taping. Such cable connectors are frequently in the form of an elbow which is installed on the end of a power cable and which can be connected to a stationary terminal of the motor by a screw-in plug.

Quick-disconnect cable connectors are characterized as being either "loadbreak" or "non-loadbreak" types, depending upon whether a connection between the connector and the motor terminal can be broken under load. However, loadbreak capability is provided only for the safety of the user, and with both types of connectors, connection and disconnection are intended to be performed with the main power supply circuit in an open circuit state. Therefore, each time a quick-disconnect cable connector is connected or disconnected, it is necessary for the operator to ascertain that the main power supply circuit for the motor is cut off. Due to the ease of making connections with this type of cable connector, through oversight or inexperience, it is quite possible for the operator to make or break a connection under load. Thus, there are safety problems with respect to conventional motors equipped with quick-disconnect cable connectors, and careful training and supervision of the operators of such motors are necessary in order to prevent accidents.

SUMMARY OF THE INVENTION

Accordingly. it is an object of the present invention to provide an electric motor equipped with a quick-disconnect cable connector which automatically opens the main power supply circuit for the motor when the cable connector is being connected or disconnected so as to prevent connection and disconnection under load.

It is another object of the present invention to provide a pole change electric motor equipped with a quick-disconnect cable connector which is more compact than a conventional pole change motor.

In one form of an electric motor in accordance with the present invention, the stator windings of the motor are electrically connected with a power supply through a quickdisconnect cable connector which connects to a terminal box mounted on the outside of the motor. The cable connector is installed on the end of a power cable which leads to the power supply for the motor. The terminal box is equipped with a detachable protective cover which fits over the cable connector and prevents the cable connector from being connected or disconnected from the terminal unless the protective cover is removed from the terminal box. A sensing means is provided for sensing the state of mounting of the protective cover and producing a corresponding output signal, and a control means is provided for electrically disconnecting the power supply from the power cable when the sensing means senses that the protective cover is removed from the terminal box.

The sensing means can be any type of detector which can detect whether the protectlve cover is mounted on the terminal box. In a preferred embodiment, the sensing means is a signal generator having a movable contact which can move between a first and a second position. the signal generator producing an output signal corresponding to each position. The signal generator is installed on the terminal box in a position such that when the protective cover is mounted on the terminal box. a portion of the protective cover will contact the movable contact and move it between its first and second positions.

In another form of the present invention, the motor is a pole change motor. A terminal box which is mounted on the housing of the motor supports at least one first terminal and at least one second terminal which are connected to the stator winding of the motor. A quick-disconnect cable connector which is connected to the end of a power cable can be detachably connected to either the first terminal or the second terminal. When the cable connector is connected to the first terminal, the motor operates with a first number of poles, and when the cable connector is connected to the second terminal, the motor operates with a second number of poles. The power cable is connected to a power supply through a protection circuit comprising at least one protective device for use when the motor is operating with the first number of poles and at least one protective device for use when the motor is operating with the second number of poles. A detecting means is provided for detecting whether the cable connector is connected to the first terminal or the second terminal and producing a corresponding output signal. A control means which is responsive to the detecting means switches the connection of the power cable between the protective device for the first number of poles and the protective device for the second number of poles in accordance with the output signal from the detecting means. Accordingly, when the cable connector is moved from one terminal to the other, a protection device suitable for the number of poles of the motor is automatically connected to the power cable.

In a preferred embodiment, the pole change motor is a threephase, two-speed motor. The first terminals comprise three terminals for low-speed operation which are connected to the stator winding so as to form a Y-connection, and the second terminals comprise three terminals for high-speed operation which are connected to the stator winding so as to form a double Y-connection.

The detecting means can be any type of detector which can detect the state of connection of the cable connectors and produce a corresponding output signal, but in a preferred embodiment, it comprises two limit switches which are secured to the terminal box. The first limit switch is disposed so as to be actuated when the cable connectors are connected to the low-speed terminals, and the second limit switch is disposed as as to be actuated when the cable connectors are connected to the high-speed terminals.

BRIEF DESCRIPTION OF THE DRAWINGS

In the drawings, the same reference numerals indicate the same or corresponding parts.

DESCRIPTION OF THE PREFERRED EMBODIMENTS

Figure 1:
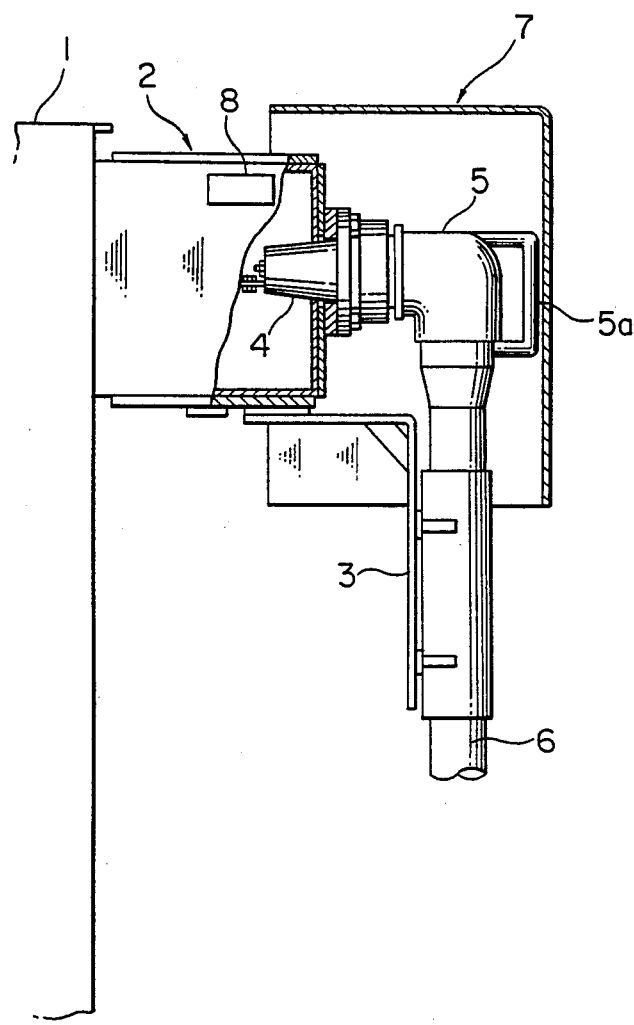
FIG. 1 is a cut-away profile of a portion of a first embodiment of an electric motor in accordance with the present invention.

Hereinbelow, a number of preferred embodiments of an electric motor in accordance with the present invention will be described while referring to the accompanying drawings, FIGS. 1 through 6 of which illustrate a first embodiment. As shown in FIG. 1, which is a cut-away profile of this embodiment, a terminal box 2 is mounted on the outside of the housing of a three-phase electric motor 1. Three stationary terminals 4 corresponding to the three different phases are mounted on one of the walls of the terminal box 2 by screws. The inner end of each terminal 4 is electrically connected to one of the stator windings for the three phases, while the outer end is electrically connected to one of three quick-disconnect cable connectors 5. The terminals 4 and the cable connectors 5 are secured to one another by means of screw-in plugs. Each cable connector 5 is in the form of an elbow of watertight construction which is connected to the end of a power cable 8. A handle 5a by means of which the cable connector 5 can be held during connection and disconnection is formed on the outside of the cable connector 5. The lower portion of each cable connector 5 is supported by an L-shaped support plate 3 which is secured to the lower surface of the terminal box 2.

Figure 2:
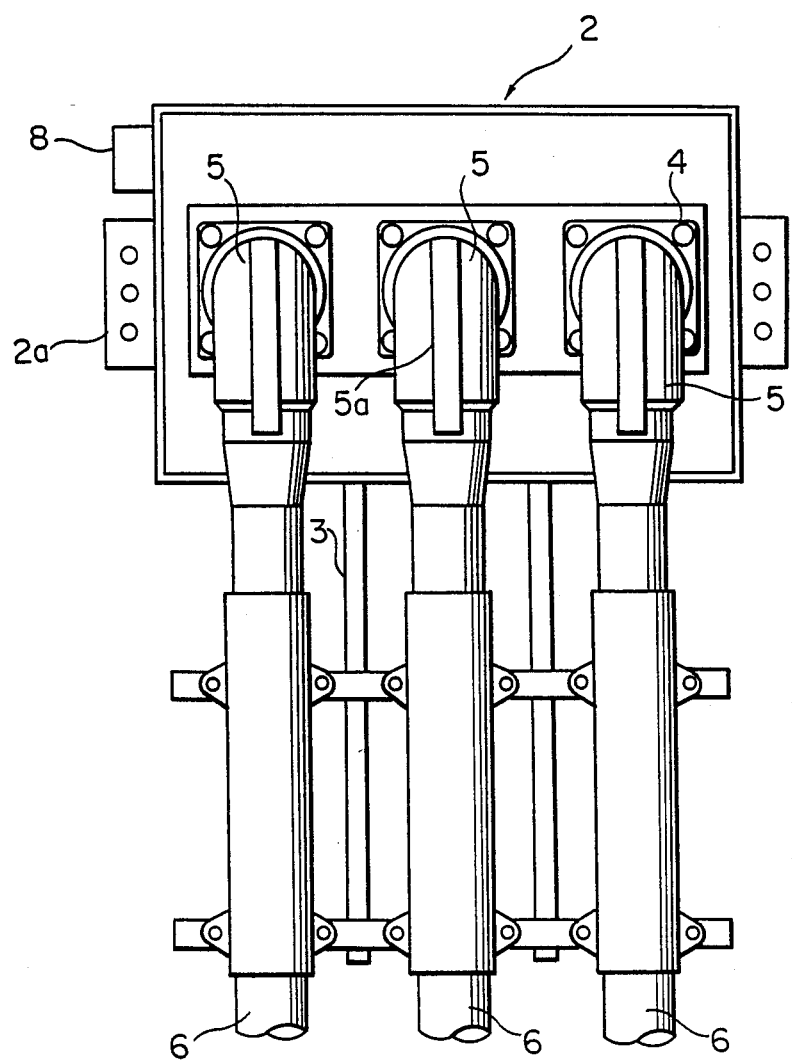
FIG. 2 is a front view of the terminal box and cable connectors of the embodiment of FIG. 1.
Figure 3:
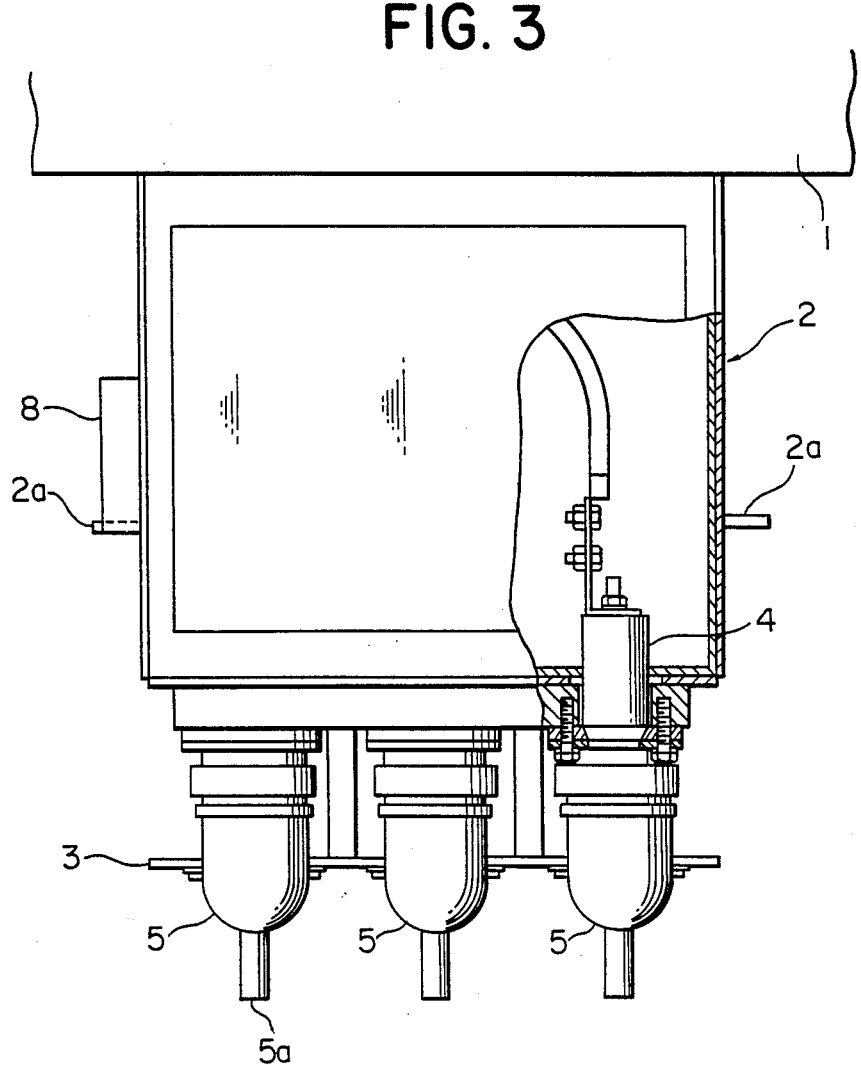
FIG. 3 is a cut-away plan view of the terminal box and cable connectors of FIG. 1.
Figure 4:
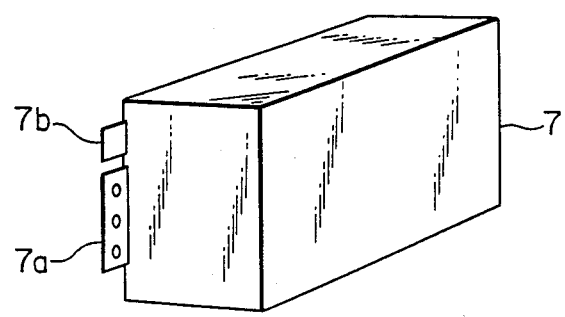
FIG. 4 is a perspective view of the protective cover of the embodiment of FIG. 1.

During operation of the motor 1, the cable connectors 5 are covered by a box-shaped protective cover 7 which surrounds the outer end of the terminal box 2. As shown in FIG. 4, which is a perspective view of the protective cover 7, two mounting flanges 7a having a plurality of through holes formed therein project from both sides of the protective cover 7. The mounting flanges 7a are secured to corresponding mounting flanges 2a which are formed on the outside of the terminal box 2, as shown in FIG. 2, which is a front view of the terminal box 2. The mounting flanges 2a of the terminal box 2 each have a plurality of through holes corresponding to the through holes in the mounting flanges 7a of the protective cover 7. The corresponding mounting flanges 2a and 7a can be connected to one another by unillustrated bolts which are inserted into the through holes.

The dimensions of the protective cover 7 are selected such that it is impossible to connect or disconnect the cable connectors 5 from the terminals 4 without first removing the protective cover 7.

As also shown in FIG. 4, a tab 7b is secured to the outside of the protective cover 7. This tab 7b serves as a means for actuating an interlock signal generator 8 which is mounted on the outside of the terminal box 2. The interlock signal generator 8 has an unillustrated movable contact by means of which the interlock signal generator 8 is actuated. The tab 7b is positioned on the protective cover 7 such that when the protective cover 7 is mounted on the terminal box 2, the tab 7b will depress the unillustrated contact and actuate the interlock signal generator 8. The interlock signal generator 8 generates two different signals, depending upon whether the contact is depressed. Namely, when the contact is not depressed, the interlock signal generator 8 produces a first output signal having a logical value of 0 which indicates that the protective cover 7 is removed, and when the contact is depressed by the tab 7b, it produces a second output signal having a logical value of 1 which indicates that the protective cover 7 is mounted on the terminal box 2.

Figure 5:
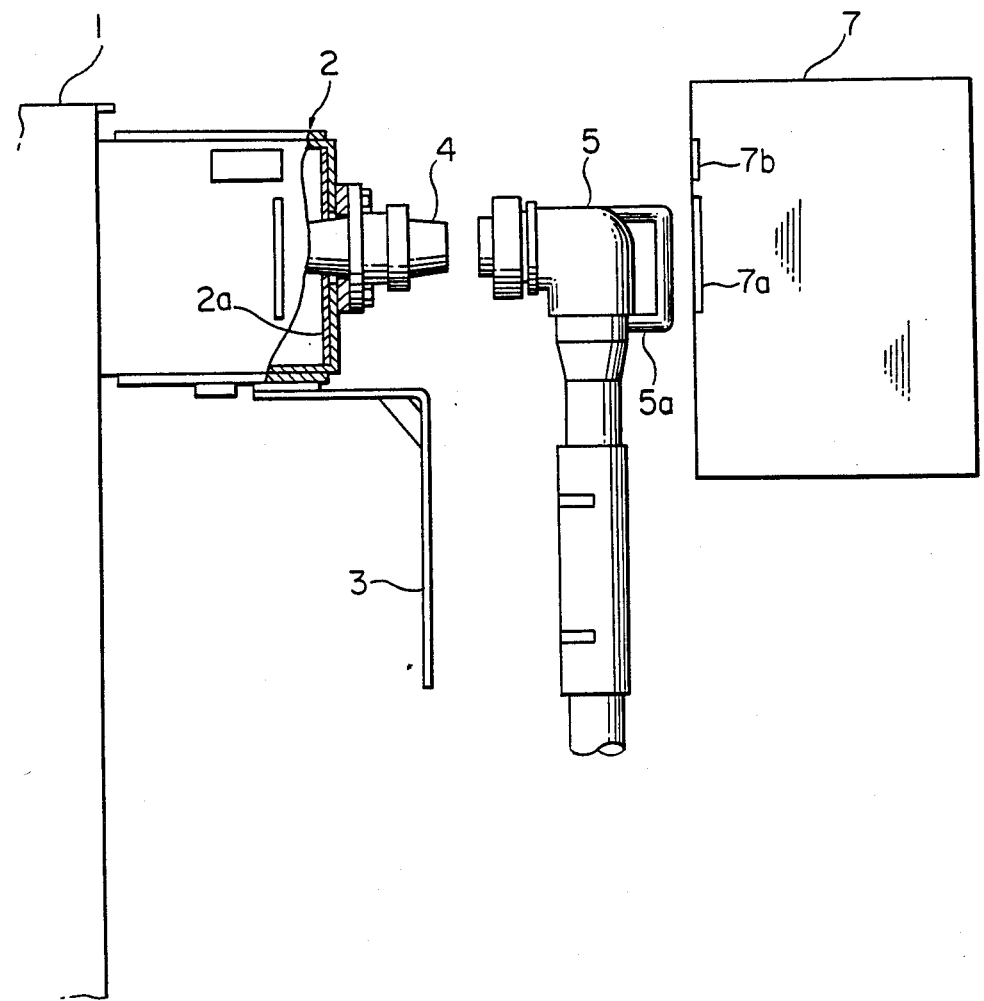
FIG. 5 is an exploded profile of the embodiment of FIG. 1.

FIG. 5 is a partially cut-away exploded profile of this embodiment.

Figure 6:
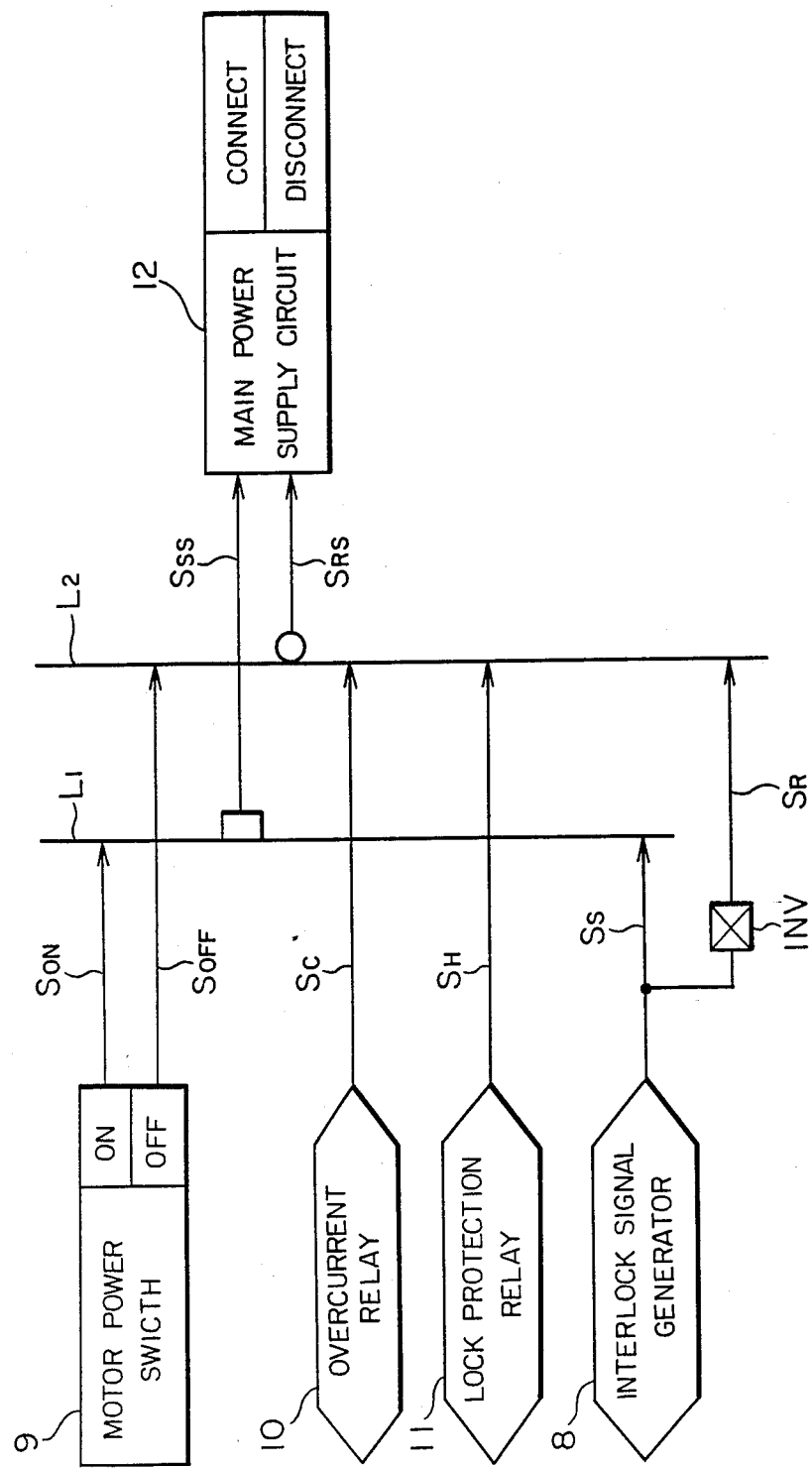
FIG. 6 is a block diagram of a control circuit for the embodiment of FIG. 1.

FIG. 6 is a block diagram of a control circuit for this embodiment. It comprises the interlock signal generator 8, a power switch 9 for the motor 1, an overcurrent relay 10, a lock protection relay 11, a main power supply circuit 12, and an inverter INV. The interlock signal generator 8 generates a signal Ss corresponding to the state of mounting of the protective cover 7, the value of Ss being 1 when the protective cover 7 is mounted and 0 when it is removed. The power switch 9 of the electric motor 1 generates an on signal Son when it is turned on and an off signal Soft when it is turned off. The overcurrent relay 10 generates an overcurrent relay operating signal Sc when it is activated. Signals Son and Sc are supplied to a first line L1 which provides a connect signal Sss to the main power supply circuit 12. Signals Soo, Sc, and Sk are supplied to a second line L2, which provides a disconnect signal Srs to the main power supply circuit 12. Signal Ss from the interlock signal generator 8 is also input to an inverter INV, which provides an inverted signal Sr to line L2.

The operation of the illustrated embodiment is as follows. Each of the cable connectors 5 can be easily disconnected from the corresponding terminal 4 by grasping it by its handle 5a, twisting the cable connector 5 slightly with respect to the terminal 4, and then pulling it outwards. However, in order to do so, it is necessary to first remove the protective cover 7 from the terminal box 2. When the protective cover 7 is removed and the tab 7b separates from the movable contact of the interlock signal generator 8, the signal Ss which ii generated by the interlock signal generator 8 takes on a logical value of 0, which indicates that the protective cover 7 is removed. Signal Ss is inverted by the inverter INV to form signal Sr, which has a logical value of 1. Signal Sr is supplied to line L2, and a disconnect signal Srs is generated, regardless of the status of signal Sss, i.e., regardless of whether the power supply switch 9 is on or off. As a result, the main power supply circuit 12 is disconnected, and no power is supplied to the power cables 6. All the while that the cable connectors 5 are being connected or disconnected, the interlock signal generator 8 continues to generate an interlock signal Ss with a logical value of 0 which indicates that the protective cover 7 is removed. Therefore, even if the power switch 9 of the motor 1 is inadvertently switched on during connection or disconnection and an on signal Son is generated, the main power supply circuit 12 remains disconnected.

When the cable connectors 5 are again connected to the terminal 4 and the protective cover 7 is again mounted on the terminal box 2, the tab 7b of the protective cover 7 will depress the movable contact of the interlock signal generator 8. The interlock signal generator 8 will then generate an interlock signal Ss with a logical value of 1 indicating that the protective cover 7 is mounted on the terminal box 2. If the power switch 9 is then turned on and an on signal Son is generated, a connect signal Sss will be generated to connect the main power supply circuit 12.

Thus, whenever the operator removes the protective cover 7, the main power supply circuit 12 is automatically disconnected and the supply of power to the power cables 6 is stopped. Accordingly, it is impossible for connection and disconnection to be performed under load, and connection and disconnection can be safely performed without the operator having to ascertain whether the power cables 6 are live.

In the above-described embodiment, the interlock signal generator 8 is installed on the outside of the terminal box 2, but it may be installed elsewhere, such as on the protective cover 7. In addition, various other types of devices may be employed for detecting the state of mounting of the protective cover 7, such as a contactless switch.

Also, in the above-described embodiment, the state of mounting of the protective cover 7 is indicated by an inverter signal Sr which branches from the signal generated by the interlock signal generator 8, but a signal generator which generates a signal corresponding to the mounting or removal of the protective cover 7 may instead be employed. It is also possible to employ a plurality of signal generators.

Figure 7:
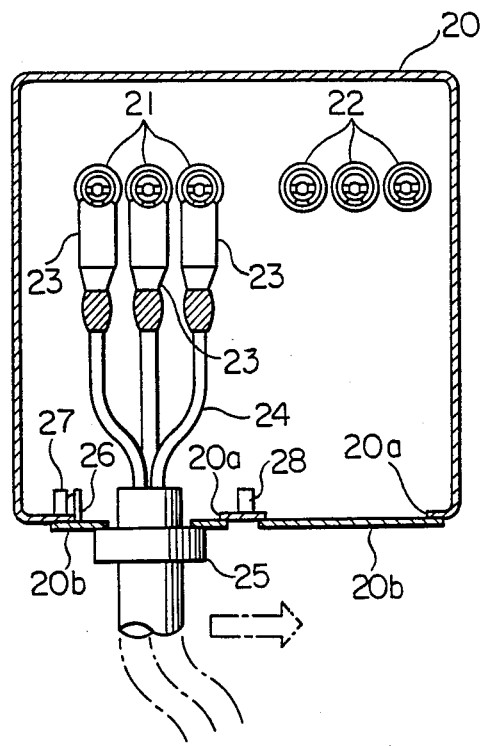
FIG. 7 is a front view of a terminal box of a second embodiment of the present invention, showing the state in which cable connectors are connected to low-speed terminals.
Figure 8:
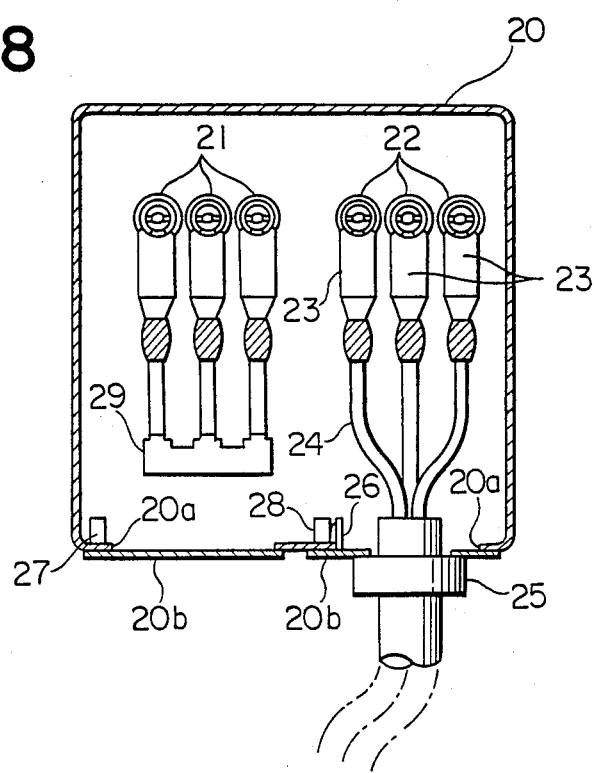
FIG. 8 is a front view of the same terminal box, showing the state in which cable connectors are connected to high-speed terminals and the low-speed terminals are shorted.

FIGS. 7 through 10 illustrate a second embodiment of an electric motor equipped with quick-disconnect cable connectors. In this embodiment, the motor is in the form of a high-voltage, three-phase pole change motor which can be switched between low-speed and high-speed operation. FIGS. 7 and 8 are front views of a terminal box of this motor when the motor is connected for low-speed and high-speed operation, respectively. As shown in these figures, a terminal box 20 which is mounted on the unillustrated housing of a motor has three low-speed terminals 21 and three high-speed terminals 22 secured thereto. The unillustrated inner ends of the terminals 21 and 22 are connected to the stator windings of the motor. When the motor is connected for low-speed operation, the outer ends of the low-speed terminals 21 are connected to three quick-disconnect cable connectors 23 which are mounted on the ends of power cables 24 corresponding to the three phases of the motor. The power cables 24 pass through one of two openings 20a which are formed in the bottom surface of the terminal box 20. The three power cables 24 are held together by a mounting sleeve 25 having a flange which can be detachably connected to the bottom of the terminal box 20. The bottom of the terminal box 20 has a low-speed limit switch 27 and a high-speed limit switch 28 mounted thereon beneath the low-speed terminals 21 and the high-speed terminals 22, respectively. The mounting sleeve 25 has a projection 26 formed thereon which operates one or the other of the limit switches when the mounting sleeve 25 is secured to the bottom of the terminal box 20. When the cable connectors 24 are connected to the low-speed terminals 21 as shown in FIG. 7, the projection 26 actuates the low-speed limit switch 27, and when they are connected to the high-speed terminals 22 as shown in FIG. 8, the projection 26 actuates the high-speed limit switch 28. Each of the limit switches produces a corresponding electrical output signal when it is actuated. When the cable connectors 23 are connected to the high-speed terminals 22 as shown in FIG. 8, the three low-speed terminals 21 are shorted by a short circuit connector 28. When the power cables 24 are not passing therethrough, the openings 20a in the bottom of the terminal box 20 are covered by cover plates 20b.

Figure 9:
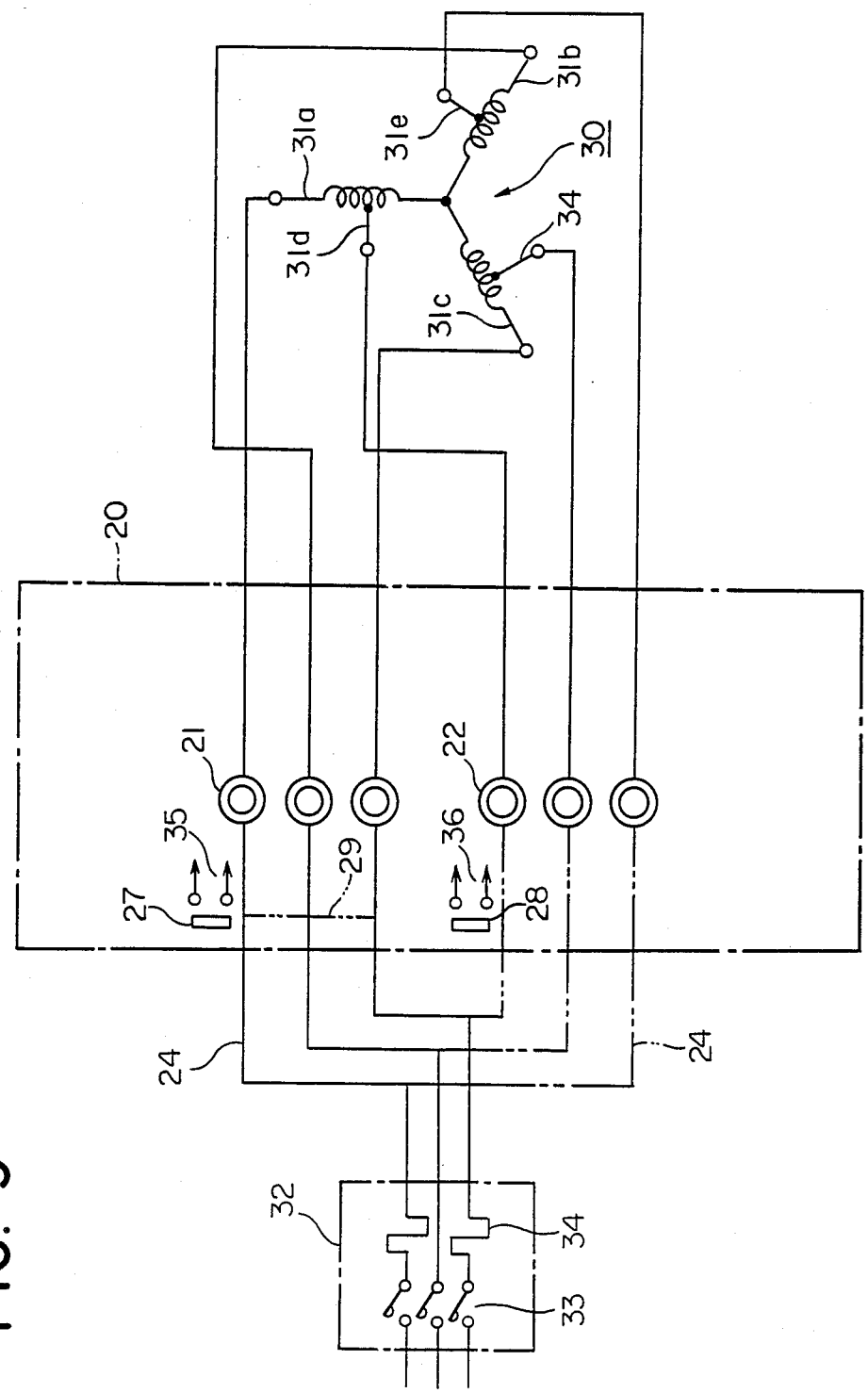
FIG. 9 is a circuit diagram of a portion of the embodiment of FIG. 7.

FIG. 9 is a schematic diagram of a portion of this second embodiment. The motor has a three-phase stator winding 30 which has six leads 31a–31f connected thereto. Leads 31a–31c are each connected to one of the low-speed terminals 21, while leads 1d–1f are each connected to one of the high-speed terminals 22. When the cable connectors 23 are connected to the low-speed terminals 21 (as shown by the solid lines), a Y-connection is formed, and when the cable connectors 23 are connected to the high-speed terminals 22 (as shown by the long and short dashed lines), a double Y-connection is formed. The three power cables 24 are connected to an unillustrated power supply through a cross board 32 which houses main circuit closing contactors (or circuit breakers) 33 for each phase, and overcurrent relays 34 for two of the phases. Reference numerals 35 and 36 respectively indicate the interlock signals which are generated by the low-speed limit switch 27 and the high-speed limit switch 28.

In a conventional pole change motor, the cross board must house a set of main circuit closing contactors for low-speed operation, a other set for high-speed operation, a set of overcurrent relays for low-speed operation, another set for high-speed operation, and a short circuit contactor for shorting the low-speed leads during high-speed operation. The cross board therefore takes up a large amount of space and is expensive. It further requires a greater length of power cable than does a single-speed electric motor, so the construction costs of a conventional pole change motor are high.

However, from FIG. 9, it can be seen that because the cross board 32 of this embodiment houses only a single set of main circuit closing contactors (or circuit breakers) 33 and a single set of overcurrent relays 34, it can be the same size as the cross board for a conventional single-speed motor. Furthermore, it requires the same length of power cable as a single-speed electric motor. Therefore, the costs of a pole change motor in accordance with the present invention are much less than for a conventional pole change motor.

In addition, due to the use of quick-disconnect cable connectors 23, it is not necessary to remove and apply insulating tape each time the power cables 24 are switched from one set of terminals to the other, and the time required for disconnection and connection of the power cables 24 is roughly half that required when using the conventional method of bolting and taping with insulating tape.

Figure 10:
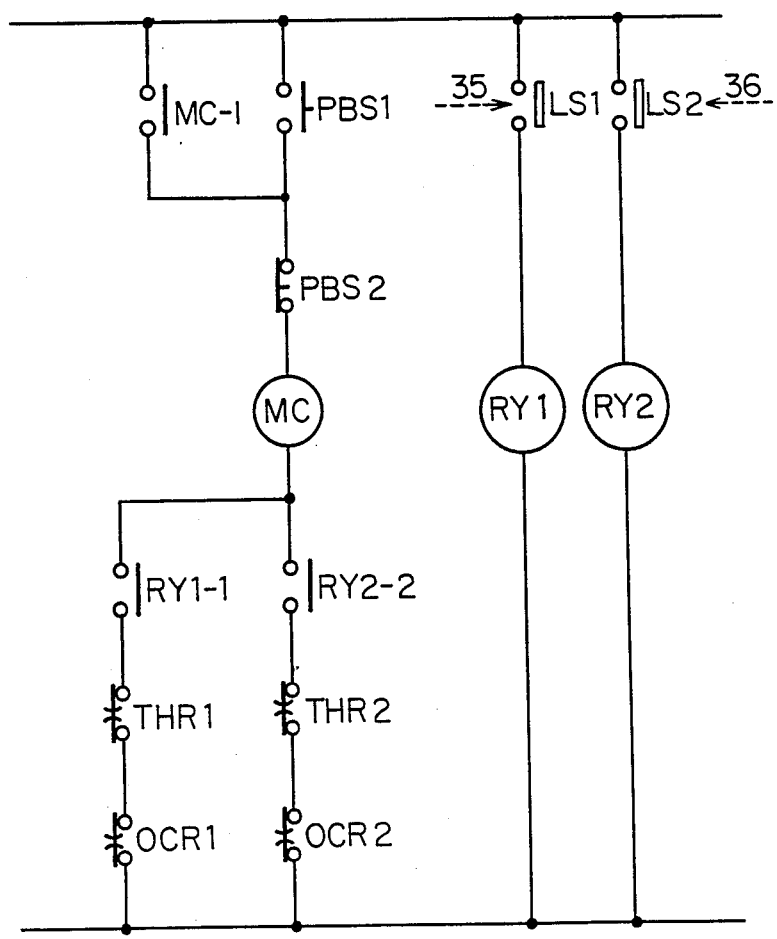
FIG. 10 is a circuit diagram of a protection circuit for the embodiment of FIG. 7.

FIG. 10 is a circuit diagram of a control circuit for this second embodiment. This control circuit comprises a relay sequence which automatically connects the motor to protection devices for low-speed operation or for high-speed operation in accordance with which of the terminals 21 and 22 are connected to the cable connectors 23. Two limit switches LS1,LS2 are connected in series to two relays RY1, and RY2, respectively. The limit switches LS1 and LS2 are respectively controlled by interlock signals 35 and 36 which are generated by the low-speed limit switch 27 and the high-speed limit switch 2a. Relay RY1 has a contact RY1-1 which is connected in series with a thermal relay THR1 and an overcurrent relay OCR1 whose characteristics are suited for low-speed operation. Relay RY2 has a contact RY2-2 which is connected in series with a thermal relay THR2 and an overcurrent relay OCR2 whose characteristics are suited for high-speed operation. These two series circuits are connected in parallel to a main relay MC, which is connected in series with a stop push button switch PBS2. The contact MC-1 of the main relay MC and a start push button switch PBS1 are connected in parallel to the stop push button switch PBS2.

The operation of this embodiment is as follows. When the cable connectors 23 are connected to the low-speed terminals 21 as shown in FIG. 7, the projection 28 of the mounting sleeve 25 actuates the low-speed limit switch 27, which generates a low-speed interlock signal 35. This signal 35 causes limit switch LS1 to close, and the current passing through relay RY1 causes its contact RY1-1 to close. If the start push button switch PBS1 is then pushed, the series circuit consisting of the start push button switch PBS-1, the stop push button switch PBS-2, the main relay MC, relay contact RY1-1, thermal relay THR1, and overcurrent relay OCR1 will be closed. The contact MC-1 of the main relay MC will then close so as to maintain the operating state after the start push button switch PBS1 is released. In this state, the motor is protected by thermal relay THR1 and overcurrent relay OCR1 which are designed for low-speed operation.

Next, when the motor is to be switched from low-speed to high-speed operation, stop push button switch PBS2 is pressed and the motor is temporarily stopped. The cable connectors 23 are then disconnected from the low-speed terminals 21 and connected to the high-speed terminals 22. The short circuit connector 29 is connected to the low-speed terminals 21 so as to short the low-speed leads 31a–31c. In this state, as shown in FIG. 8, the projection 26 of the mounting sleeve 25 contacts the high-speed limit switch 28. The high-speed limit switch 28 generates a high-speed interlock signal 36 which closes limit switch LS2. The current passing through relay RY2 causes its contact RY2-2 to close, and if the start push button switch PBS1 is then pushed, the series circuit consisting of the start push button switch PBS-1, the stop push button switch PBS-2, the main relay MC, relay contact RY2-2, thermal relay THR2, and overcurrent relay OCR2 will be closed. The contact MC-1 of the main relay MC will then close so as to maintain the operating state after the start push button switch PBS1 is released. In this state, the motor is protected by thermal relay THR2 and overcurrent relay OCR2 which are designed for high-speed operation.

Thus, whenever the connector cables 23 are connected to the terminals 21 or 22, the motor is automatically connected to protection devices which are suited for the number of poles with which the motor is operating.

In the above-described embodiment, torque-squared connection switching (double Y-connection/Y-connection) is carried out. However, the same effects can be achieved with constant torque control connection switching (double Y-connection/delta-connection) connection) or constant output control connection switching (delta-connection/double Y-connection).

As the preceding embodiment of a pole change motor is a high-voltage motor, a separate cable connector 23 is employed for each phase, but in the case of a low-voltage motor, a single cable connector for all three phases can be used.

Also, in the above embodiment, a detector for detecting the state of mounting of the cable connectors is a limit switch which is actuated by a projection, but a different type of detector can be employed with the same effects. For example, a detector which detects the presence of a cable connector itself or an auxiliary contact mounted on a cable connector can be used.

Although not shown in the drawings, a protective cover 7 and an interlock signal generator 8 like that shown in FIG. 1 can also be employed with this second embodiment so as to automatically disconnect the main power supply circuit from the cable connectors 23 whenever the cable connectors 23 are being connected or disconnected from the terminals.

What is claimed is:

1. An electric motor equipped with a quick-disconnect cable connector comprising:
   a motor housing which houses a rotor and a stator;
   a terminal box which is mounted on the outside of said motor housing;
   a terminal which is secured to said terminal box, one end of said terminal being electrically connected to a winding of said motor;
   a quick-disconnect cable connector which can be detachably connected to the other end of said terminal, said quickdisconnect cable connector being mounted on the end of a power cable which is connected to the power supply of said motor;
   a protective cover which can be detachably mounted on said terminal box so as to cover said quick-disconnect cable connector when it is connected to said terminal, the dimensions of said protective cover being such that it is impossible to connect or disconnect said quick-disconnect cable connector when said protective cover is mounted on said terminal box;
   sensing means for sensing whether said protective cover is mounted on said terminal box and producing a corresponding output signal; and
   control means responsive to said sensing means for electrically disconnecting said main power supply circuit from said power cable when said sensing means senses that said protective cover is not mounted on said terminal box.

2. An electric motor as claimed in claim 1, wherein:
   said sensing means comprises a signal generator which has a movable contact which can move between a first and a second position, said signal generator generating a first signal when said movable contact is in said first position and a second signal when said movable contact is in said second position; and
   said signal generator is mounted on said terminal box such that a portion of said protective cover contacts said movable contact and moves it from said first to said second position when said protective cover is mounted on said terminal box.

3. A pole change electric motor comprising:
   a motor housing which houses a rotor and a stator;

a terminal box which is mounted on the outside of said motor housing;

a first terminal which is secured to said terminal box and is electrically connected to the stator windings of said motor so that said motor will operate with a first number of poles;

a second terminal which is secured to said terminal box and is electrically connected to the stator windings of said motor so that said motor will operate with a second number of poles; a quick-disconnect cable connector which can be detachably connected to said terminals, said cable connector being mounted on the end of a power cable which is connected to a power supply for said motor;

detecting means for detecting which of said terminals said quick-disconnect cable connector is connected to and producing a corresponding output signal; and control means responsive to said detecting means for connecting said power cable to a protection circuit for said first number of poles when said detecting means detects that said quick-disconnect cable connector is connected to said first terminal and connecting said power cable to a protection circuit for said second number of poles when said detecting means detects that said quick-disconnect cable connector is connected to said second terminal.

4. An electric motor as claimed in claim 3, wherein said detecting means comprises a first limit switch and a second limit switch which are secured to said terminal box, said electric motor further comprising an actuating member which is secured to said quick-disconnect cable connector in a position such as to actuate said first limit switch when said quick-disconnect cable connector is connected to said first terminal and such as to actuate said second limit switch when said quick-disconnect cable connector is connected to said second terminal.

5. An electric motor as claimed in claim 3, wherein:
said motor is a three-phase motor;
there are three of said first terminals corresponding to said three phases which are connected to said stator winding so as to form a Y-connection; and
there are three of said second terminals corresponding to said three phases which are connected to said stator winding so as to form a double Y-connection.

6. An electric motor as claimed in claim 3, wherein:
said motor is a three-phase motor;
there are three of said first terminals corresponding to said three phases which are connected to said stator winding so as to form a double Y-connection; and
there are three of said second terminals corresponding to said three phases which are connected to said stator winding so as to form a delta-connection.

7. An electric motor as claimed in claim 3, further comprising:
a protective cover which can be detachably mounted on said terminal box so as to cover said quick-disconnect cable connector when it is connected to either of said terminals, the dimensions of said protective cover being such that it is impossible to connect or disconnect said quick-disconnect cable connector from said terminals when said protective cover is mounted on said terminal box;
sensing means for sensing the whether said protective cover is mounted on said terminal box and producing a corresponding output signal; and
control means responsive to said sensing means for disconnecting said main power supply circuit from said power cable when said sensing means senses that said protective cover is not mounted on said terminal box.

* * * * *